Oct. 10, 1961 P. E. BESSIERE 3,003,421
RECIPROCATING LIQUID PUMPS, AND IN PARTICULAR
IN FUEL INJECTION PUMPS
Filed Feb. 23, 1961 7 Sheets-Sheet 1

INVENTOR
Pierre Etienne Bessiere
BY
Bailey, Stephens & Huettig
ATTORNEYS

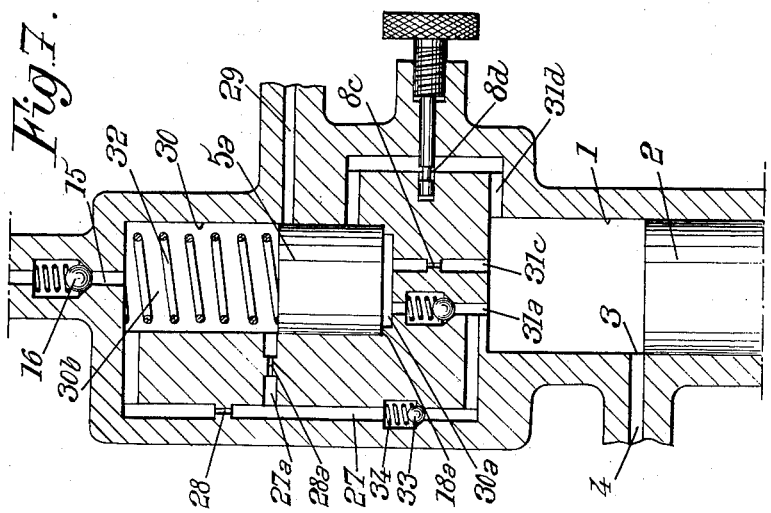
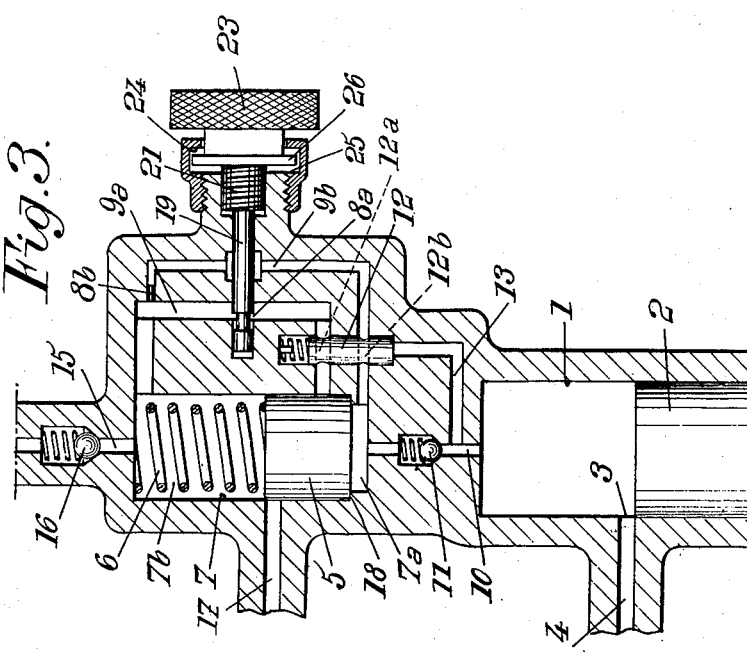

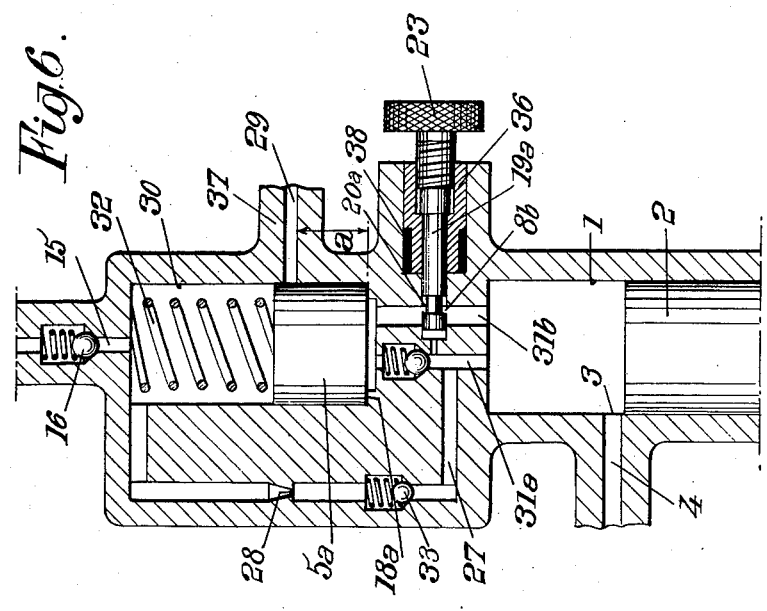
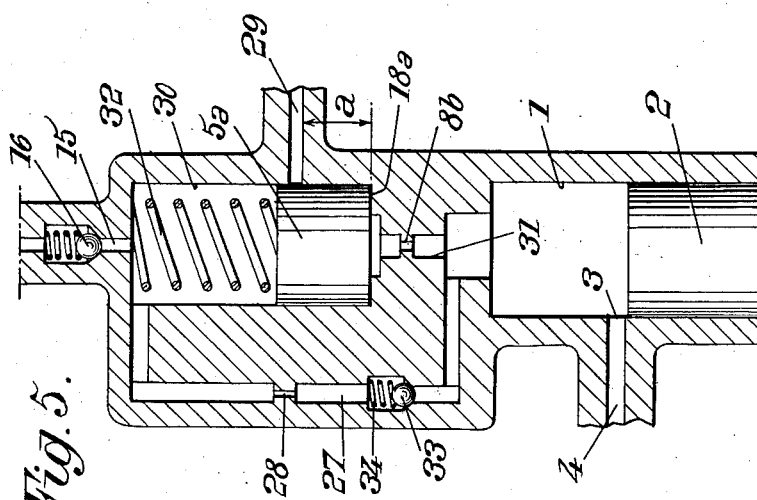

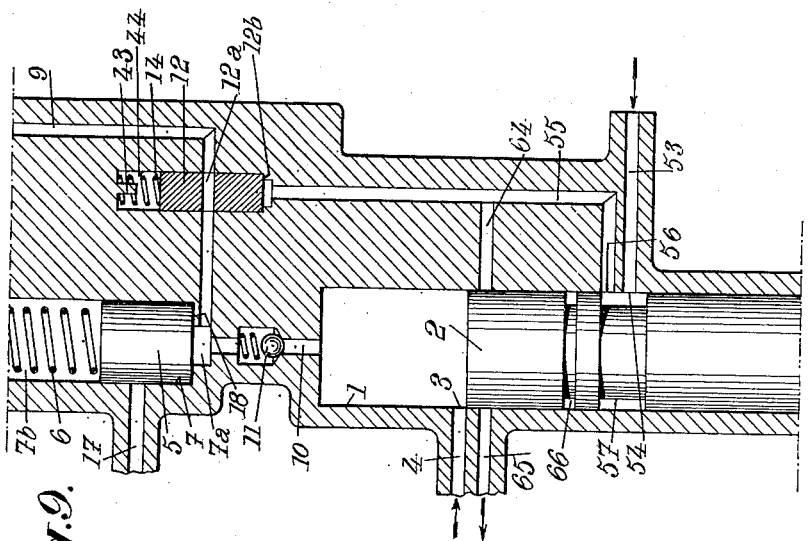
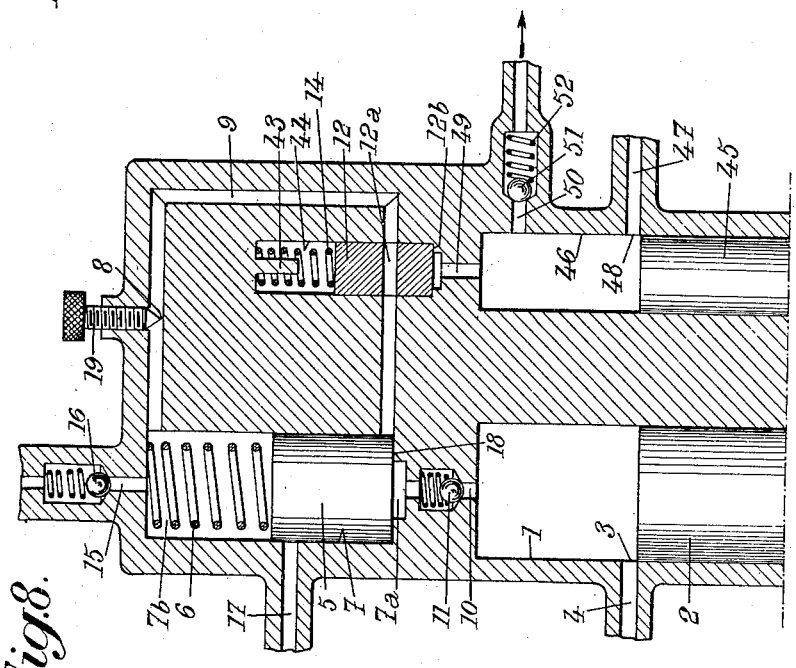

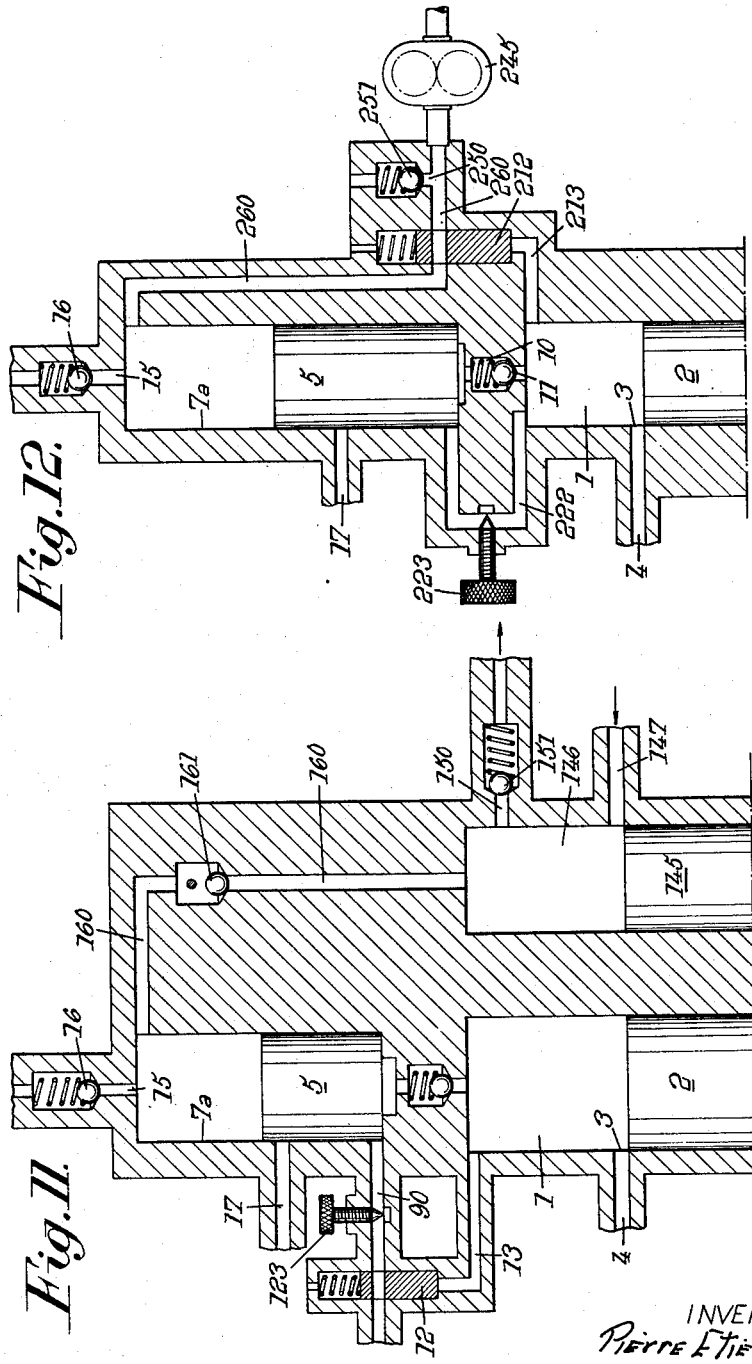

_United States Patent Office_

3,003,421
Patented Oct. 10, 1961

3,003,421
RECIPROCATING LIQUID PUMPS, AND IN PARTICULAR IN FUEL INJECTION PUMPS
Pierre Etienne Bessiere, 55 Blvd. du Commandant Charcot, Neuilly-sur-Seine, Seine, France
Filed Feb. 23, 1961, Ser. No. 90,984
Claims priority, application France Aug. 14, 1956
22 Claims. (Cl. 103—41)

The present invention relates to reciprocating liquid pumps, that is to say to pumps the active part of which (piston, diaphragm or the like) has a reciprocating movement, and it is more especially but not exclusively concerned with fuel injection pumps for internal combustion engines.

The chief object of my invention is to provide a pump of this kind which is better adapted to meet the requirements of practice and, in particular, which limits the speed of the engine, on which it is mounted to a maximum value which must not be exceeded whatever be the variations of the load, this limit speed being possibly the working speed chosen by the driver or any other person supervising the operation of the engine.

The invention consists chiefly in causing at least a portion of the liquid delivered by the piston of the pump during the delivery stroke thereof to move in the outward direction a shuttle member, said member being subjected to the action of a return force, produced by a return spring or other suitable means, and in braking the return movement of this member to its position of rest under the action of said return force, during the suction stroke of the pump piston, this braking being preferably obtained by providing a throttled portion in the conduit through which must flow, during said return movement, the liquid having moved the shuttle member in the outward direction, the whole being arranged in such manner that, for speeds of rotation of the pump shaft exceeding a given value, the return strokes of said shuttle member become shorter and shorter as the speed of the engine increases, this reduction of the return strokes as a function of the speed of the engine serving to an automatic regulation of the engine speed.

It should be noted here that the term "suction stroke of the pump piston" means the whole period which extends from the end of a first delivery stroke of the pump piston (the piston being then in its inner dead center position) to the beginning of the next delivery stroke of this piston, this period therefore including the whole of the movement of the piston from its inner dead center position toward and to its outer dead center position and the time for which it may remain in said outer dead center position.

Preferred embodiments of my invention will be hereinafter described with reference to the accompanying drawings, given merely by way of example and in which:

FIG. 1 is a diagrammatic vertical section of a fuel injection pump made according to the present invention.

FIGS. 2 to 4 inclusive are views similar to FIG. 1, showing three different modifications of the pump of FIG. 1, respectively.

FIG. 5 diagrammatically shows, in axial section, the cylinder of a fuel injection pump provided with a regulating device made according to the invention, this device being completed by a second regulating device which cooperates with the first one.

FIGS. 6 and 7 show modifications of the device shown by FIG. 5.

FIGS. 8 and 9 show two other modifications of the device illustrated by FIG. 1.

FIGS. 11 and 12 show two other modifications.

Figure 2:
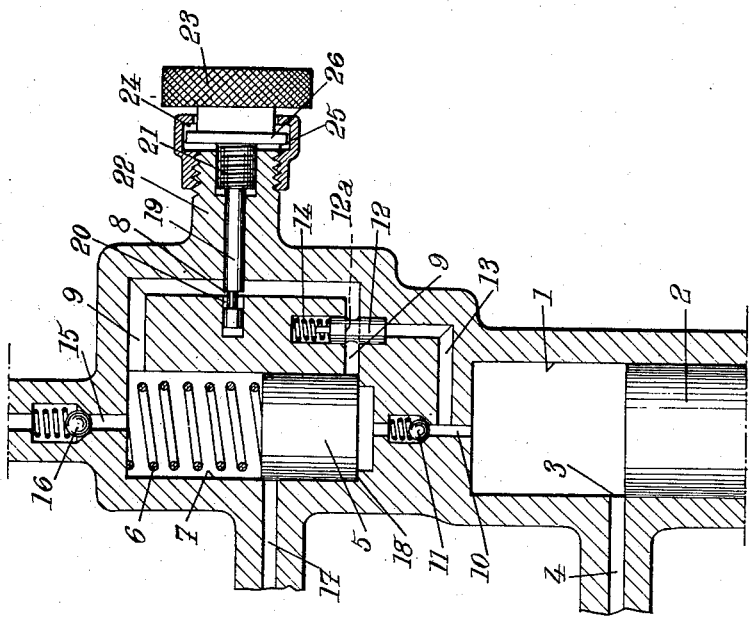

As already stated, the pumps illustrated by the drawings are supposed to be fuel injection pumps. They are for instance intended for Diesel engines, and they belong to a fuel injection device including one or several injectors supplied with fuel by said pumps.

Each injection pump includes a cylinder 1 in which reciprocates a piston 2 driven in any suitable manner, for instance by means of a cam (not shown). This piston 2 cooperates with a port 3 through which the fuel conduit 4 opens into the pump cylinder 1.

In order to obtain an automatic regulation as a function of the speed, and in particular for speeds exceeding a predetermined value, which regulation imposes a speed limit on the engine supplied with fuel by means of the pump, I operate as follows, according to my invention.

At least a portion of the fuel delivered by piston 2 during its delivery stroke (upward stroke) after port 3 has been closed, is made to displace a movable member 5, in the form of a piston, slidable against the action of a return spring 6 in a cylinder 7, and the return movement of said movable member 5 (which takes place during the suction, that is to say the downward stroke of pump piston 2) is braked by means of a throttled portion 8 provided in the conduit 9 through which must flow, during said return movement of the regulating piston 5, the fuel which has previously produced the displacement of said movable member 5 in the upward direction.

It will be understood that the return speed of regulating piston 5 depends only upon the return force exerted by spring 6 and upon the dimensions of the throttled portion 8.

As long as the time T corresponding to the return of regulating piston 5 is lower than or at most equal to the time $\theta$ of the upward movement of pump piston 2 ($\theta$ depending upon the speed of the engine on which is mounted the injection pump), regulating piston 5 can always move through the whole of its return stroke, this stroke therefore undergoing no variations. But if the speed of the engine increases to such a degree that $\theta$ becomes smaller than T, piston 5, before it has moved through the whole of its return stroke, is again struck by a stream of fuel driven by the upwardly moving piston 2, and this stream of fuel causes piston 5 to move back upwardly. Thus, the stroke is shortened, or reduced and the reduction is the more important as the difference $T-\theta$ becomes greater. In other words, as soon as $\theta$ becomes lower than T, the fuel delivered by piston 2 forms a kind of liquid abutment for piston 5, which abutment stops this piston in the course of its return stroke the sooner as the speed of the pump piston, and therefore the speed of the engine itself are higher. This reduction of the stroke of piston 5 is taken advantage of to reduce the amount of fuel delivered by the injection pump to the corresponding injector or injectors, and this reduction may be so great that it prevents the engine from exceeding a predetermined limit speed.

This main feature of my invention may be applied in various ways. According to an advantageous embodiment of the invention, the inside of cylinder 1 is connected through a conduit 10 containing a check-valve 11 with the lower chamber 7a of cylinder 7, this conduit permitting the fuel delivered by piston 2 during its upward stroke to pass into said chamber 7a. Chamber 7a is connected, through the above mentioned conduit 9 which includes the throttled portion 8, with the chamber 7b of cylinder 7 located above piston 5. A valve 12 closes said conduit 9 during the upward stroke of piston 2 and opens it only during the downward stroke of said piston. In order to control valve 12, said valve is made in the form of a slide valve the lower end face of which is subjected, through a conduit 13, to the action of the pressure in cylinder 1, whereas the upper end face of slide valve 12 is subjected to the action of a return spring 14. Furthermore, this slide valve 12 is provided with a passage 12a extending therethrough and positioned in such manner that it is in line with conduit 9 when spring 14 has pushed valve 12 into its lowermost position (shown by FIG. 1). If, due to the upward displacement of piston 2, a rise of pressure takes place in cylinder 1, this pressure moves slide valve 12 in the upward direction and thus causes conduit 9 to be closed.

Cylinder 7 is also in communication, on the one hand with delivery conduit 15, advantageously provided with a check-valve 16 and leading to the injector or injectors to be fed by the pump, and on the other hand, with a discharge conduit 17 opened by piston 5 when said last mentioned piston has moved a given distance in cylinder 7.

Finally, cylinder 7 includes, at a small distance from its lower end, a shoulder 18 against which piston 5 is applied by spring 6 when it returns to its position of rest.

The device shown by FIG. 1 works as follows.

During the upward stroke of piston 2, said piston delivers fuel into the chamber 7a of cylinder 7, which causes piston 5 to move upwardly in this cylinder. During this stroke of piston 2, no fuel is fed to chamber 7b since slide valve 12 closes conduit 9 during the whole of the upward stroke of piston 2. Even after the opening of discharge conduit 17 by piston 5, slide valve 12 remains in its closed position because the opening of conduit 17, while producing a pressure drop, still maintains a pressure sufficient to keep conduit 9 closed. When piston 2 stops and starts moving down, piston 5 moves down in cylinder 7 and slide valve 12 is brought into its opening position (FIG. 1) by return spring 14. The amount of fuel present in chamber 7a is then discharged by piston 5, through conduit 9 and its throttled portion 8, into the chamber 7b of cylinder 7. If the movement of piston 2, and therefore the speed of the engine on which the pump is mounted are relatively slow, piston 5 comes back, under the thrust of spring 6, into its position of rest, where it is applied against shoulder 18. It can therefore transfer into the chamber 7b of cylinder 7 a maximum volume of fuel. This amount of fuel is delivered, through delivery conduit 15, toward the injector during the next upward stroke of piston 2, this upward stroke producing an upward displacement of piston 5 which acts directly as delivery piston upon the fuel present in the chamber 7b of cylinder 7.

If, due to an increase of the speed of the engine, the time θ corresponding to the upward stroke of piston 2 becomes shorter than the time T necessary for the downward movement of piston 5, this last mentioned piston is stopped in its downward movement before it has reached its lowermost possible position by the stream of fuel delivered by piston 2 which is again moving upwardly, so that the downward movement of piston 5 is correspondingly shortened or reduced. This reduction of the downward movement of piston 5 produces a corresponding reduction of the amount of fuel delivered from chamber 7b into delivery conduit 15. Furthermore, the amount of fuel that is made to pass, during the next downward stroke of piston 5, into chamber 7b is also correspondingly reduced. The fuel which stops the downward movement of piston 5 before said piston has been able to reach its position of rest determined by shoulder 18 therefore acts as a kind of liquid abutment which stops the downward movement of piston 5 the sooner as the speed of piston 2 is greater and which correspondingly reduces the amount of fuel delivered on every stroke of the piston of the injection pump toward the injector fed by said pump. This reduction has for its effect to prevent the engine from exceeding a predetermined maximum value.

Preferably, means are further provided for varying the downward speed of piston 5 in cylinder 7 and consequently the maximum speed of the engine on which the device is fitted. In order to modify this downward speed of piston 5, I advantageously vary the cross-section of the throttled portion 8 and I provide abutments which determine the minimum and maximum values of the cross-section of said throttled portion. The minimum value of said cross-section corresponds to the minimum limit speed and the maximum section corresponds to the maximum limit speed of the engine.

Figure 10:
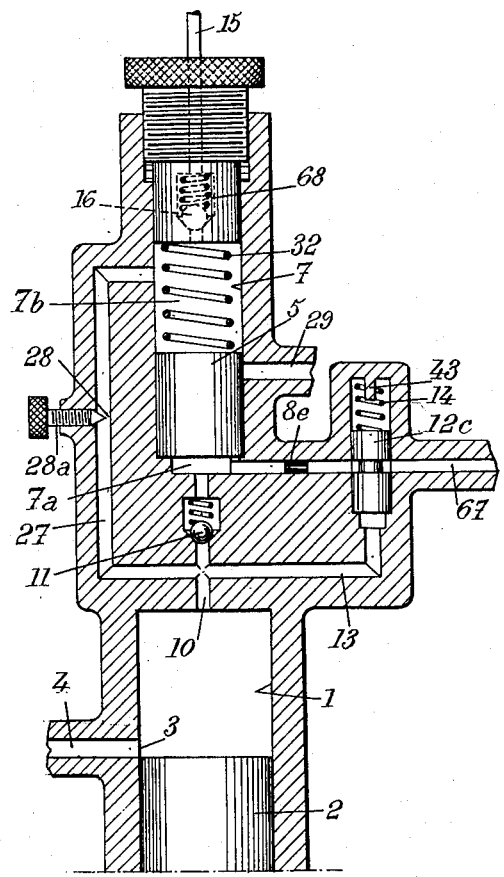
FIG. 10 shows another modification of the invention.

According to another embodiment of my invention, the strength of the spring designated, in the above described embodiment by reference numeral 6, may be modified in order to vary the maximum speed of the engine. For instance, on FIG. 10, a similar spring, designated by reference numeral 32, is adjustable by means of a threaded abutment 68. Of course, I might vary simultaneously the strength of spring 6 and the cross-section of throttled portion 8.

Figure 1:
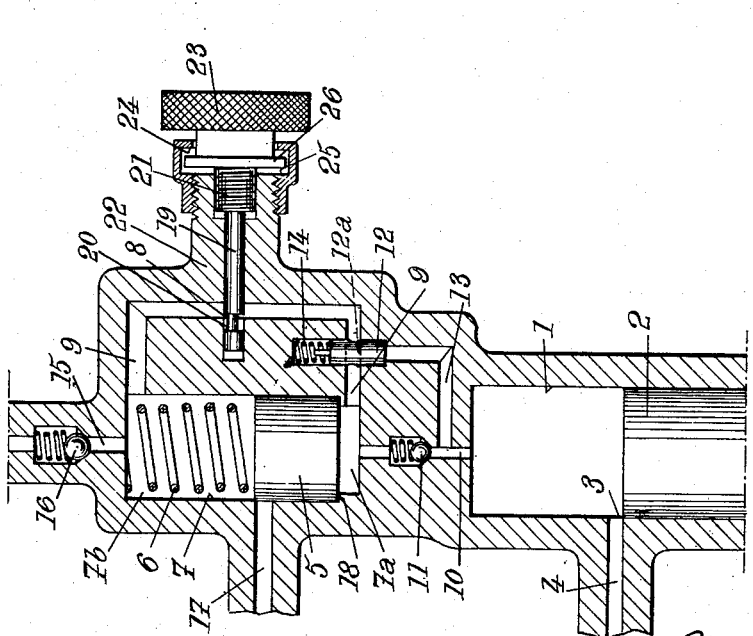

In the embodiment of FIG. 1, the only variable element is the cross-section of the throttled portion 8. For this purpose, I provide a rod 19 which extends through conduit 9 and is slidable in a direction at right angles to the axis of the portion of said conduit 9 through which said rod 19 passes. Rod 19 is provided with a groove 20 which, according to its position with respect to conduit 9, determines, together with the walls of conduit 9, a throttled portion of variable cross-section.

In order to produce the desired sliding displacement of rod 19, said rod is provided with a threaded portion 21 by means of which the rod is screwed in the body 22 of the device. To make it possible to rotate this rod, it is further provided, at its outer end, with a knob 23 or the like. The end positions of rod 19 are determined by abutments 24, 25 which cooperate with a collar 26 rigid with rod 19.

Of course, instead of manually controlling the position of rod 19, I may also have it controlled by a pedal, a speed governor or any other suitable means. Anyway, by adjusting the cross-section of the throttled portion, it is possible to vary the limit speed of the engine.

In order to compensate for the influence which might be exerted on the adjustment of the cross-section of the throttled portion 8 by variations of viscosity of the fuel due to variations of its temperature, I provide, according to my invention, means for automatically varying the cross-section of the throttled portion as a function of the temperature of the fuel or of an analogous temperature.

When the means for varying the cross-section of the throttled portion 8 include a rod 19 of substantial length, said automatic compensation as a function of the temperature may be obtained by making this rod of a metal which expands more under the effect of a rise of temperature than the body 22 in which it is slidable. When this rod is elongated due to a rise of temperature, it automatically produces a reduction of the cross-section of the throttled portion 8 capable of compensating for the variations of viscosity of the fuel due to said rise of temperature.

The modification illustrated by FIG. 2 differs from the construction of FIG. 1 merely by the fact that, in the apparatus of FIG. 2, piston 5, when it is in its position of rest, in which it is applied by spring 6 against shoulder 18, closes the inlet of conduit 9.

The modification illustrated by FIG. 3 differs from that of FIG. 1 by the fact that the chambers 7a and 7b of cylinder 7 communicate together through several conduits, for instance two conduits 9a and 9b each of which is provided with a throttled portion 8a and 8b respectively. These conduits open at different levels into the chamber 7a of cylinder 7 and are both closed by a slide valve 12 when the piston 2 of the pump is moving upwardly, whereas they are both opened by passages 12a and 12b provided in said slide valve when said pump piston is moving downwardly.

It generally suffices to make the throttled portion of one of the conduits, for instance conduit 9a, adjustable and to leave the throttled portion of conduit 9b of fixed dimension. Due to the provision of a plurality of conduits such as 9a and 9b, it is possible to obtain different operations of the regulating device in accordance with the speed of the engine. For instance, in particular, it is possible to obtain a particularly high flow rate of the pump at very low speed, for instance at speeds below 400 revolutions per minute, in order to facilitate the starting of the engine, and a normal flow rate for speeds exceeding this value. This result is obtained with the construction of FIG. 3 where conduit 9a (the throttled portion 8a of which is adjustable by rod 19) opens into cylinder 7 at some distance above shoulder 18, whereas conduit 9b which is provided with the fixed throttled portion 8b opens into chamber 7a below shoulder 18. When piston 5 is in its position of rest determined by said shoulder, only conduit 9b can be opened by slide valve 12, conduit 9a being anyway closed by piston 5. The throttled portion 8b of conduit 9b is determined in such manner that when the speed of the engine is lower than a very low value (for instance 400 revolutions per minute), piston 5 returns to its position of rest, which corresponds to the delivery, by the pump, of a flow rate of fuel 50% higher than the normal flow rate. When the speed of the engine becomes higher than 400 revolutions per minute, the liquid abutment starts working and prevents piston 5 from coming back to its position of rest. Under normal working conditions of the engine, piston 5 never comes substantially below the place where conduit 9a opens into chamber 7a of cylinder 7. By adjusting the cross-section of throttled portion 8a, between its minimum and maximum values, it is possible to adjust the limit speeds of the engine, for instance between such values such as 600 revolutions per minute (idling speed) and 2000 revolutions per minute.

Figure 4:
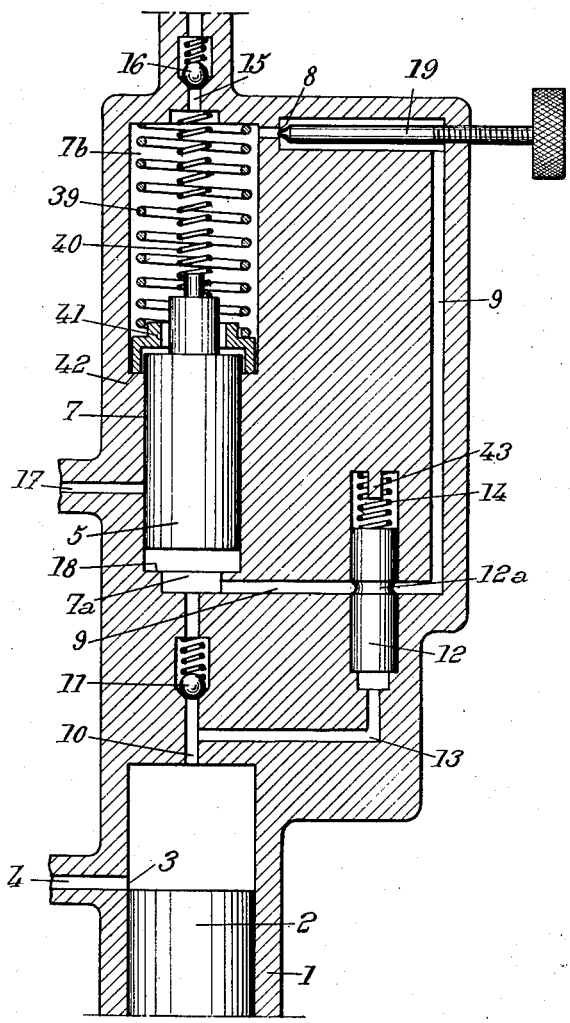

The pump shown by FIG. 4 is similar to that shown by FIG. 1, with the exception of the resilient means acting on piston 5 to move it in the downward direction. These means are constituted by two springs 39 and 40 which, during the first part of the downward movement of piston 5, act together thereon, whereas the action of one of these springs is stopped at the end of this first part of the movement of piston 5. For this purpose, spring 40 acts directly and constantly upon piston 5, whereas spring 39 acts upon said cylinder through a ring 41, against a shoulder on which said spring 39 is applied. Ring 41 is stopped by a shoulder 42 of cylinder 7 when piston 5 has moved through the first part of its downward stroke. As soon as ring 41 is applied against said shoulder 42, the action of the spring 39 on piston 5 ceases.

Preferably, the force exerted by spring 40 is much less than that exerted by spring 39, so that the force of the resilient return means, after the stopping of spring 39, undergoes a great reduction.

The operation of this device is as follows.

When the engine is just starting and its speed is very low, for instance 100 revolutions per minute, the time elapsing between the end of the delivery stroke of piston 2 and the beginning of the next delivery stroke is sufficiently long to enable piston 5 to be pushed back as far as abutment 18, the last part of this movement being effected under the action of spring 40 alone. In this case I obtain a flow rate which is about 50% higher than the maximum normal flow rate of the pump. If the speed increases gradually, spring 40 is no longer able to apply piston 5 against abutment 18 but a supplementary flow rate is still obtained due to the fact that spring 40 still produces a supplementary stroke of piston 5 beyond the first part of this stroke, the end of which is determined by ring 41 being stopped by shoulder 42. For instance, when the engine has a speed averaging 400 revolutions per minute, about three quarters of the supplementary flow rate have been eliminated and the flow rate comes near to the normal maximum flow rate, which is reached for instance when the speed is 500 revolutions per minute. For speeds above this value, piston 5 no longer moves beyond the first part of its downward stroke, during which both of the springs 39 and 40 act thereupon.

This system is advantageous because the supplementary flow rate is obtained at low speeds of the engine through simple means and this supplementary flow rate can easily be adapted to the desired law of variations of the flow rate.

I may also provide means of adjustment of at least one of the two springs that make it possible to vary the law of production of the supplementary flow rate, or even to dispense therewith if so desired. It is also obvious that the position of shoulder 42 may be adjustable.

In a modification, the two above mentioned springs 39, 40 might be replaced by a single helical spring, and shoulder 42 by an abutment stopping, at the end of the first portion of the downward stroke of piston 5, some of the turns of this spring so that only the remainder of the spring remains effective.

According to another feature of my invention, I combine, with the above described regulation device based upon the speed of regulating piston 5 during its downward movement, another regulating device based upon the speed of piston 5 during its upward movement. For this purpose, as shown by FIG. 5, the fuel to be injected is delivered immediately toward conduit 15 by the main pump piston 2 during its upward movement. This delivery takes place through a conduit 27 provided with a throttled portion 28 which is different from the throttled portion 8 above referred to. During this upward movement of the main pump piston 2, the regulating piston 5a serves to open more or less, according to the speed of piston 2 and consequently according to the speed of the engine on which the injection pump is mounted, a discharge conduit 29 which is located at a distance a above the shoulder 18a which determines the position of rest of piston 5a. In order to enable piston 5a to work in this manner, it is mounted inside a cylinder 30 the lower end of which communicates, through a conduit 31, with the portion of conduit 27 located upstream of throttled portion 28, whereas the other end of this cylinder 30 communicates with the portion of conduit 27 located downstream of its throttled portion 28. Consequently, the regulating piston 5a, during the upward movement of the main pump piston 2, is subjected to the action of the difference of the pressures existing in conduit 27 upstream and downstream of the throttled portion 28 thereof, respectively. Furthermore, the regulating piston 5a is constantly urged by a spring 32 toward its position of rest in which it is applied against shoulder 18a. The difference of the pressures acting on the opposed faces of piston 5a increases with the speed of the engine so that the speed at which piston 5a moves upwardly to travel over distance a increases more rapidly than the mean speed of piston 2 during its upward stroke. Consequently, piston 5a opens discharge conduit 29 at a time relatively earlier when the speed of rotation of the pump, therefore of the engine, rises, which reduces the amount of fuel discharged on every piston stroke through discharge conduit 15 the more as the speed of the engine increases.

Concerning the return movement of regulating piston 5a toward its position of rest, it is braked by a throttled portion 8b of conduit 31. Consequently, for speeds above a given mean speed of the main pump piston 2, there is formed, below piston 5a between this piston and its shoulder 18a, a liquid abutment as above mentioned. This liquid abutment reduces the length of the return movement of piston 5a the more as the speed of the engine is higher. This reduction of the return stroke of the regulating piston 5a also has for its effect further to reduce the time necessary for enabling the regulating piston 5a, during the upward stroke of piston 2, to open the discharge conduit 29. The two effects thus obtained, that is to say the acceleration of the upward movement of piston 5a when the speed of the engine increases, and the reduction of the return stroke of this piston 5a in the same conditions, are therefore added together and produce a particularly efficient regulation which wholly prevents the engine from exceeding the limit value which has been fixed.

In the construction illustrated by FIG. 5, the throttled portion 8b of conduit 31 must not have a detrimental action upon the self regulation effect ensured by the throttled portion 28 and which takes place during the upward movement of piston 2. For this purpose, the throttled portion 8b must have a cross-section substantially greater than the cross-section of the throttled portion 28. This condition involves the choice of a spring 32 as weak as possible so that the cross-section of the throttled portion 8b may be as great as possible.

Of course, it is advantageous to complete the double regulation device diagrammatically shown by FIG. 5 by providing adjusting means (not shown on the drawings) capable of varying the cross-section of the throttled portion 8b and/or that of the throttled portion 28. Such means might be constituted by needle-valves or by means such as shown by FIG. 3 which further ensure an automatic compensation as a function of the temperature. I might also provide means for adjusting the strength of spring 32 (see FIG. 10).

The pump of FIG. 5 further includes a check valve 33 inserted in conduit 27 and applied upon its seat by a spring 34 of such strength that piston 5a cannot, during its return stroke, cause fuel to flow through conduit 27.

The device shown by FIG. 6 differs from that of FIG. 5 essentially by the fact that the conduit 31 of FIG. 5 is replaced by two conduits 31a and 31b. Conduit 31a, of large cross-section, which includes a check valve, permits the inflow of fuel under the regulating piston 5a during the upward stroke of the main pump piston 2, whereas conduit 31b includes the throttled portion 8b which brakes the back-flow of fuel from the lower chamber of cylinder 30 toward the cylinder 1 of the pump and therefore the return movement of piston 5a.

In the embodiment illustrated by FIG. 6, the cross-section of the throttled portion 8b can be adjusted by a rod 19a, analogous to the rod 19 of FIGS. 1 to 3, and including a groove 20a which determines the cross-section of the throttled portion in combination with the wall of conduit 31b. This rod 19a is screwed in a sleeve 36 fixed in the body 37 of the regulating device by means of an expansible ring 38 in which the sleeve is mounted with a force fit. This sleeve constitutes at the same time, for rod 19a, an abutment which determines the maximum cross-section of the throttled portion 8b. Furthermore, it is advantageous to constitute this sleeve of a metal which expands more under the effect of a rise of temperature than the metal of rod 19a screwed in the sleeve. In this way, the sleeve automatically produces a reduction of the cross-section of the throttled portion 8b when the temperature of the whole rises and when, consequently, the viscosity of the fuel decreases. The maximum speed of the engine, which depends upon the cross-section of the throttled portion 8b, therefore remains independent of the variations of viscosity of the fuel.

The operation of the device of FIG. 6 is quite analogous to that of the device of FIG. 5. By reducing the cross-section of the throttled portion 8b from the position where this cross-section is maximum, it is possible to pass from the full flow rate to any intermediate flow rate. As a matter of fact, the gradual closing of the throttled portion 8b produces an increase of the time T of return of the regulating piston 5. As soon as this time T becomes longer than the time $\theta$ for the return of the main pump piston 2, a liquid abutment is created which becomes the larger as the difference $T-\theta$ becomes greater. By reducing the cross-section of the throttled portion 8b to the maximum degree, it is possible to reduce the length of stroke of the regulating piston 5a as much as it may be desired. This minimum length of stroke may for instance correspond to the requirements of the engine of a lorry running on a level road.

It results from the preceding explanations that the regulation obtained with the device of FIG. 6 (and also with that of FIG. 5 if the throttled passage 8b is adjustable) is a regulation for all speeds, that is to say that it works automatically for any limit speed the value of which depends upon the adjustment of the cross-section of the throttled passage 8b.

As long as the liquid abutment is not formed, the regulation is obtained owing to the control of the discharge conduit 29 by the regulating piston 5a which is actuated by the difference between the pressures acting upon its opposed faces, which difference is due to the provision of the throttled passage 28 in conduit 27. This first regulation is completed by the regulation due to the formation of the liquid abutment for speeds exceeding a given value, which is determined by adjusting the cross-section of the throttled passage 8b.

In order to improve this arrangement, I may advantageously provide, instead of a single conduit 31 provided with a throttled portion, two or more conduits, each provided with a throttled portion and at least one of which includes means for adjusting the cross-section of its throttled portion, these conduits, with possibly the exception of one of them, being further controlled by the regulating piston 5a. Furthermore, conduit 27 may open into the upper chamber 30b of cylinder 30 through several channels each of which is provided with a throttled portion 28, the ports through which these channels open into said cylinder chamber being located at different levels, so that at least some of them are controlled by the regulating piston 5a. It is thus possible to obtain a device with a double regulation which ensures a supplementary flow rate at very low speeds corresponding to the starting of the internal combustion engine.

An example of such a regulating device will be described with reference to FIG. 7. In this embodiment, the lower chamber 30a of cylinder 30 communicates with the inside of the cylinder 1 of the pump through a conduit 31a where the flow of fuel from the cylinder 1 toward chamber 30a is practically not braked, and also through two conduits 31c, 31d which permit the return of fuel from chamber 30a to pump cylinder 1 and each of which includes a throttled portion designated respectively by 8c and 8d.

Conduit 31c connects chamber 30a with cylinder 1, whereas conduit 31d, the throttled portion 8d of which is adjustable, is closed by piston 5a when said piston is in its position of rest for which it is applied by spring 32 against shoulder 18a, and also for the positions of this piston for which it is nearing said shoulder 18a. Furthermore, conduit 27 includes, in addition to a throttled portion 28 which is located in a branch of this conduit opening into the upper portion of the chamber 30b of cylinder 30, a second branch 27a provided with a throttled portion 28a, this second branch opening into cylinder 30 at a point which is immediately above the upper surface of regulating piston 5a when said piston is in its position of rest.

The operation of the device of FIG. 7 is as follows:

When the engine is being started, the supplementary flow rate delivered by the pump, which is for instance 50% of the normal flow rate, is ensured by the presence of the branch 27a of conduit 27. This branch being opened and the engine running at a very low speed, for instance below 400 revolutions per minute, the difference between the pressures acting on the two opposed faces of regulating piston 5a is insufficient to move this piston away from shoulder 18a. The delivery flow rate of the pump piston is therefore maximum. When the speed of the engine becomes for instance, at the end of the starting period, 400 revolutions per minute, piston 5a begins to be lifted and closes the branch 27a of conduit 27. At the same time, there is formed, owing to the provision of the throttled passage 8c in conduit 31c, a liquid abutment which prevents piston 5a from coming back to its position of rest and from reopening branch 27a. Consequently, from this time on, the normal working of the regulating device takes place without a supplementary flow rate.

For slightly higher speeds, for instance for speeds exceeding 600 revolutions per minute, conduit 31d determines the limit speed of the engine which is for instance equal to 600 revolutions per minute for the minimum cross-section of the throttled portion 8d and to 2000 revolutions per minute for the maximum cross-section of the throttled portion 8d.

In the embodiments illustrated by FIGS. 1 to 4 where a valve device in the form of a slide valve 12 closes conduit 9 during the upward displacements (delivery strokes) of the piston 2 of the pump, the movements bringing said slide valve into its closing position and keeping it in this position are ensured by a portion of the liquid placed under pressure by the main pump piston 2, so that slide valve 12 is subjected to the very high pressures of the pump.

On the contrary, in the embodiments illustrated by FIGS. 8 and 9, this operation of slide valve 12 is ensured by means of a fluid other than that placed under pressure by the piston 2 of the pump. In this case, the action of this other fluid upon slide valve 12, during the upward stroke of the pump piston 2 is either produced by an auxiliary element constituted for instance by the piston of an auxiliary pump and driven in such manner as to remain in phase with the piston 2 of the pump (its upper dead center positions coinciding in time with those of the pump piston), or controlled by this last mentioned piston.

Concerning the fluid used for this purpose, it may be of the same nature as that placed under pressure by the piston 2 of the pump, that is to say it may be constituted by the fuel. But it may also be of a different nature, that is to say it may be a liquid different from the fuel compressed by the pump piston, or even a gas. This fluid may act either by the action of its pressure or by suction.

The device shown by FIG. 8 corresponds to the first case. In other words, the action of the fluid serving to move slide valve 12, movable in its cylinder 44, is produced by an auxiliary piston 45 working in a cylinder 46 into which the fluid in question is fed through a conduit 47 opening into cylinder 46 at 48, at a level immediately above the top face of piston 45 when said piston is in its lowermost position. If the fluid which is fed to cylinder 46 is the fuel supplied by cylinder 1, the same transfer pump may be used for feeding said fuel simultaneously to conduits 4 and 47.

Cylinder 46 communicates with the lower end of cylinder 44 through a conduit 49. Furthermore, cylinder 46 is provided with a discharge conduit 50 in which is mounted a check valve 51 which opens, in the direction from cylinder 46 toward the outside, when the pressure inside cylinder 46 exceeds the force of spring 52 which tends to keep check valve 51 upon its seat.

In view of the fact that the pressure necessary to operate slide valve 12 may be relatively low, ranging for instance between ½ kg. and 12 kg., spring 52 has a strength slightly higher, for instance from 2 to 20 kgs.

The auxiliary piston 45 is controlled through any suitable means so as to obtain simultaneous passage of pistons 2 and 45 through their upper dead center positions simultaneously. If use is made of a cam to control piston 45, this cam may be the same as that which controls piston 2, but however this is not a necessity.

As soon as piston 45, during its upward movement, closes port 48, slide valve 12 is pushed upwardly against abutment 43 and closes conduit 9. Subsequently, check valve 51 opens and allows the excess of fluid delivered by piston 45 to escape to the outside while keeping in cylinder 46 and under slide valve 12, a pressure sufficient to keep this slide valve applied against abutment 43 during the whole of the upward stroke of piston 45. When the piston 45 starts moving downwardly, which coincides with the beginning of the suction stroke of piston 2, slide valve 12 is pushed back by spring 14 toward shoulder 12b and then opens conduit 9.

According to a modification which is not illustrated by FIG. 8, I may use, to constitute pistons 2 and 45, a single stepped piston.

In the pump illustrated by FIG. 9, the fluid which controls the operation of slide valve 12 comes from a source supplying a fluid under substantially uniform pressure and said fluid is controlled by piston 2 of the pump. This source of fluid may be the transfer pump itself which serves to feed fuel to the cylinder 1 or any other pump of the gear type or of any other suitable type. The source may also be constituted by a diaphram pump or a piston pump feeding an accumulator of fluid under pressure which ensures the desired uniform pressure. I may also make use, for supplying the fluid under pressure, of a gravity feed.

If the source of fluid to be used for operating slide valve 12 is the transfer pump, the flow rate of said pump must be sufficient to deliver fluid for operating slide valve 12 and to supply the chamber of cylinder 1, if these operations take place simultaneously. However, this condition need not be complied with if, as shown by FIG. 2, the opening 3 of the fuel feed conduit 4 through which fuel is fed through cylinder 1, is closed before the conduit feeding the fluid for operating slide valve 12 is itself closed.

In the construction of FIG. 9, the fluid serving to operate slide valve 12 and which may be constituted by fuel supplied from the transfer pump, is fed through a conduit 53 opening at 54 into the lower portion of the cylinder 1 of the pump, where piston 2 is reciprocating. A second conduit 55, capable of feeding said fluid to slide valve 12, also opens into said lower portion of cylinder 1 at a point 56 located slightly above the level of opening 54. I provide a groove 57 in the wall of piston 2, said groove being located at a level such that it connects conduits 53 and 55 together when the piston 2 of the pump is in its lower position illustrated by FIG. 2. The height of groove 57 is preferably chosen in such manner that said communication is cut off, during the upward movement (delivery stroke) of piston 2, slightly after the closing of port 3 by said piston 2. When conduits 53 and 55 are placed in communication with each other, the fluid moves slide valve 12 in the position in which it is applied against abutment 43, that is to say in which it opens conduit 9.

Slide valve 12 comes back into the position shown by the drawings, where it opens conduit 9, just when the piston 2 of the pump has reached its uppermost position and is going to start moving down. This result is due to the fact that conduit 55 is placed in communication with a discharge conduit 65 through a conduit 64 and a groove 66 provided in the wall of piston 2 at a level such that it connects conduits 64 and 65 together when piston 2 reaches its inner dead center position (that is to say its uppermost position).

Whatever be the embodiment of the flow rate regulating device according to my invention that is chosen, said device may always be combined with a self-regulating device for controlling the lead to injection in accordance with the speed of the engine. In this case, the device for regulating the lead to injection is advantageously placed upstream of the flow rate regulating device.

Furthermore, concerning the location of the flow rate regulating device according to the present invention, and whether or not it is used in combination with a self-regulating device for controlling the lead to injection as above mentioned, it is not necessary to mount it directly upon the cylinder of the injection pump; it may be located at any suitable point of the pipe system extending between the pump cylinder and the injector mounted on the cylinder of the internal combustion engine.

In the particular case where a single cylinder serves to feed successively a plurality of injectors with fuel, a single flow rate regulating device according to the present invention may be used for regulating the feed to the respective injectors, provided that said regulating device is interposed in the single delivery conduit which connects the pump cylinder with the point from which branch off the individual delivery conduits leading to the respective injectors.

When the flow rate regulating device according to the present invention is used in an injection device characterized in that two or more cylinders of the injection pump including each, at their outlet, a check valve, are connected to a manifold from which branch off the individual conduits which feed fuel to the various injectors, the number of which is a multiple of the number of pump cylinders, it is advantageous to mount the flow rate regulating device according to the present invention on said manifold so that a single flow rate regulating device co-operates with all the injectors.

The conduit which includes a throttled passage such as 8 and through which flows the liquid pushed back by the regulating piston during its downward stroke, might lead to an external reservoir. This is shown on FIG. 10 where such a discharge conduit is shown at 67 (the throttled passage being 8c).

In the construction of FIG. 11, the return strokes of shuttle piston 5 are produced by the pressure of fuel fed to chamber 7a through a feed conduit 160 from an auxiliary pump 145—146. The piston 145 of this auxiliary pump is driven by the same means that drive piston 2, but with a phase difference of 180° (i.e. the delivery strokes of piston 145 take place during the return strokes of piston 2 and the return strokes of piston 145 take place during the delivery strokes of piston 2). Cylinder 146 is provided with a by-pass or discharge conduit 150 containing a spring loaded valve 151 so that the pressure of the fuel fed through conduit 160 can never exceed a given value. Thus, this pressure acts in the same manner as the spring 6 of FIG. 1 of the preceding embodiment.

The operation is similar to that above described with the difference that the liquid forced back during every return stroke of shuttle piston 5 flows to the outside past the throttled passage produced by screw 123 and chamber 7a is fed from the auxiliary pump 145—146.

In the construction of FIG. 12, the return strokes of shuttle piston 5 are produced by the pressure of fuel fed to chamber 7a through a feed conduit 260 from a gear pump 245 driven at a suitable speed. Feed conduit 260 carries a discharge conduit 250 containing a spring loaded valve 251 so that the pressure of the fuel fed through conduit 260 can never exceed a given value determined by the loading of said valve 251.

The operation is the same as that above described with the difference that the liquid forced back during every return stroke of shuttle 5 returns to the main cylinder 1 through conduit 222 provided with a throttled passage produced by screw 223, chamber 7a being fed with fuel from auxiliary pump 245.

Of course, instead of spring 6, or the hydraulic pump means just above described, I might use, to produce the return strokes of shuttle 5, any means capable of exerting on said shuttle a limited thrust in the direction of said return strokes. I might for instance use an electro-magnet excited during the return strokes of piston 2.

In a general manner, while I have, in the above description, disclosed what I deem to be practical and efficient embodiments of my invention, it should be well understood that I do not wish to be limited thereto as there might be changes made in the arrangements, disposition and form of the parts without departing from the principle of the present invention as comprehended within the scope of the accompanying claims.

The present application is a continuation in part of my application Serial Number 673,343 filed on July 22, 1957, now abandoned.

What I claim is:

1. For use with an internal combustion engine, a reciprocating action fuel pump which comprises, in combination, a pump cylinder, a piston adapted to cooperate with said cylinder mounted for reciprocating movement therein, so as to limit therewith a variable volume working space, the movements of said piston in said cylinder in the direction for which the volume of said working space is reduced being called delivery strokes, and those in the opposed direction return strokes, a casing rigid with said cylinder provided with a discharge port opening to the outside, a shuttle member adapted to control said discharge port, said shuttle member fitting movably in said casing so as to limit with the inner wall thereof a variable volume chamber, the movements of said shuttle member in said casing in the direction for which the volume of said chamber is increased being called outward strokes and the movements of said shuttle member in the opposed direction being called return strokes, a fuel delivery means, conduit means in said casing including a connection from said working space to said fuel delivery means and a connection to said variable volume chamber and providing an outflow for liquid from the variable volume chamber, valve means in the connection to the variable volume chamber responsive to movements of said piston to close said connection during the return strokes of said piston, and said outflow having its smallest cross-section very substantially less than the cross-section of the shuttle member so as to slow down said liquid outflow and thus to exert on said shuttle member, during its return strokes, a braking action such that, for speeds of operation of the pump above a given value, said shuttle member return strokes are shorter as the speed of operation of the pump is higher, movement of said piston feeding liquid through said conduit means to said variable volume chamber during the delivery strokes thereof to produce outward strokes of said shuttle member; means, operative at least during the return strokes of said piston, for exerting a limited thrust on said shuttle member to urge it in the direction to produce the return strokes thereof, fuel being fed to said delivery means during the delivery strokes of said piston, the feed of fuel to said delivery means being stopped during every delivery stroke of said piston at least after the shuttle member has cleared said discharge port.

2. For use with an internal combustion engine, a reciprocating action fuel pump which comprises, in combination, a pump cylinder, a piston adapted to cooperate with said cylinder mounted for reciprocating movement therein, so as to limit therewith a variable volume working space, the movements of said piston in said cylinder in the direction for which the volume of said working space is reduced being called delivery strokes, and those in the opposed direction return strokes, a casing rigid with said cylinder provided with a discharge port opening to the outside, a shuttle member adapted to control said discharge port, said shuttle member fitting movably in said casing so as to limit with the inner wall thereof a variable volume chamber, the movements of said shuttle member in said casing in the direction for which the volume of said chamber is increased being called outward strokes and the movements of said shuttle member in the opposed direction being called return strokes, a fuel delivery means, conduit means in said casing including a connection from said working space to said fuel delivery means and a connection to said variable volume chamber and providing an outflow for liquid from the variable volume chamber, valve means in the connection to the variable volume chamber responsive to movements of said piston to close said connection during the return strokes of said piston, and said outflow having its smallest cross-section very substantially less than the cross-section of the shuttle member so as to slow down said liquid outflow and thus to exert on said shuttle member, during its return strokes, a braking action such that, for speeds of operation of the pump above a given value, said shuttle member return strokes are shorter as the speed of operation of the pump is higher, movement of said piston feeding liquid through said conduit means to said variable volume chamber during the delivery strokes thereof to produce outward strokes of said shuttle member, and resilient means interposed between said casing and said shuttle member for urging said shuttle member in the direction to produce the return strokes of said shuttle member, fuel being fed to said delivery means during the delivery strokes of said piston, the feed of fuel to said delivery means being stopped during every delivery stroke of said piston at least after the shuttle member has cleared said discharge port.

3. A fuel pump as claimed in claim 2 having means operatively connected with said piston for closing said outflow during the delivery strokes of the piston.

4. A pump according to claim 3 further including means responsive to variations of the temperature of the fuel in said conduit means for varying the cross-section of said throttled portion in accordance with said fuel temperature variations.

5. A pump according to claim 3 further including means responsive to variations of the temperature of the fuel in said conduit means for varying the cross-section of said throttled portion in accordance with said fuel temperature, variations, said last mentioned means including a rod having a coefficient of thermal expansion higher than that of the metal of said conduit.

6. For use with an internal combustion engine, a reciprocating action fuel pump which comprises, in combination, a pump cylinder, a piston adapted to cooperate with said cylinder mounted for reciprocating movement therein, so as to limit therewith a variable volume working space, the movements of said piston in said cylinder in the direction for which the volume of said working space is reduced being called delivery strokes and those in the opposed direction return strokes, a casing rigid with said cylinder provided with a discharge port opening to the outside, a shuttle member adapted to control said discharge port, said shuttle member fitting movably in said casing so as to limit with the inner wall thereof a variable volume chamber, the movements of said shuttle member in said casing in the direction for which the volume of said chamber is increased being called outward strokes and the movements of said shuttle member in the opposed direction being called return strokes, a conduit opening into said chamber for the inflow of liquid thereto, valve means in said conduit responsive to movements of said piston to close said conduit during the return strokes of said piston, means operatively connected with said piston for feeding liquid through said conduit during the delivery strokes of said piston to produce outward strokes of said shuttle member, resilient means interposed between said casing and said shuttle member for urging said shuttle member in the direction to produce the return strokes of said shuttle member, a fuel delivery circuit including said cylinder working space and a delivery conduit in communication with said working space and leading to the internal combustion engine to be fed by the pump, whereby fuel is fed to said delivery conduit during the delivery strokes of said piston, said working space being connected with said casing so that the feed of fuel to said delivery conduit is stopped during every delivery stroke of said piston when said shuttle member has cleared said discharge port, a conduit starting from said variable volume chamber of said casing for the outflow of liquid therefrom during the return strokes of said shuttle member, and means in said liquid outflow conduit for throttling a portion thereof to slow down said liquid outflow and thus to exert on said shuttle member, during its return strokes, a braking action such that, for speeds of operation of the pump above a given value, said shuttle member return strokes are the shorter as the speed of operation of the pump is higher.

7. For use with an internal combustion engine, a reciprocating action fuel pump which comprises, in combination, a pump cylinder, a piston adapted to cooperate with said cylinder mounted for reciprocating displacement therein, a casing rigid with said cylinder, said casing forming a space and a passage leading from said cylinder to said space, a shuttle member fitting in said space so as to be movable therein in one direction in response to rises of the liquid pressure in said cylinder, said shuttle member dividing said space into two separate chambers, resilient means interposed between said casing and said shuttle member for urging said member to move in said space in the opposed direction, the movements of said shuttle member in said first mentioned direction being called outward strokes, and those in said second mentioned direction being called return strokes, a fuel delivery conduit leading from that of said chambers located on the other side of said shuttle member from said passage, means forming a communication between said cylinder and said last mentioned chamber so that said shuttle member controls, in accordance with the amplitude of its reciprocating movement in said space, the amount of fuel fed through said delivery conduit on every reciprocation of said shuttle member, conduit means starting from the portion of said space located for the outflow of the fuel driven back by said shuttle member during the return strokes thereof, said conduit means including a throttled portion so as to brake the flow of fuel therethrough, and valve means in said passage to prevent backflow of fuel therethrough whereby said throttled portion exerts a braking action on the movement of said shuttle member during said return strokes thereof such that, for speeds of operation of the pump above a predetermined value, the return strokes of said shuttle member are the shorter as the speed of operation of the pump is higher.

8. A fuel pump according to claim 7 in which said conduit means lead to a space distinct from said pump cylinder, the pump further including valve means in said conduit means operative in response to the reciprocating movement of said piston to prevent the flow of fuel through said conduit means during the delivery strokes of said piston.

9. A fuel pump according to claim 7 in which said conduit means form a by-pass conduit arranged to connect together said two portions of said space, this pump further including valve means in said conduit means operative in response to the reciprocating movement of said piston to prevent the flow of fuel through said by-pass conduit during the delivery strokes of said piston.

10. A fuel pump according to claim 7 in which said conduit means lead back from said second mentioned portion of said space to said pump cylinder, the means forming a communication between said cylinder and said first mentioned portion of said space being a conduit extending directly from said cylinder to said first mentioned portion of said space, said casing being provided with a passage leading from said second mentioned portion of said space to the outside and adapted to be cleared by said shuttle member for an outward stroke of given amplitude of said shuttle member.

11. A pump according to claim 7 including a second cylinder rigid with the first one and the inside of which constitutes said space, said shuttle member being a second piston slidably mounted in said second cylinder to cooperate therewith, said second cylinder being provided at an intermediate point thereof with a discharge port, the opening of said port taking place the earlier, during every delivery stroke of said main piston, as the speed of said last mentioned piston is higher.

12. For use with an internal combustion engine, a reciprocating action fuel pump which comprises, in combination, a main cylinder, a main piston adapted to cooperate with said cylinder mounted for reciprocating displacement therein, said cylinder having a delivery orifice, a second cylinder rigid with the first one, a passage extending between one end of said second cylinder and said delivery orifice of said main cylinder, a second piston adapted to cooperate with said second cylinder and mounted for reciprocating displacement therein, said second cylinder being divided by said second piston into two chambers, to wit a first chamber located at said above mentioned end of said second cylinder and a second chamber located at the other end of said second cylinder, a fuel delivery conduit in communication with said second chamber, a check valve mounted in said passage to prevent fuel from flowing back from said first chamber to said main cylinder, a spring device interposed between said second cylinder and said second piston to exert on said second piston a return force opposed to that exerted on said second piston by the fuel pressure from said main cylinder during the delivery stroke of said main piston, a by-pass conduit arranged to connect said two chambers of said second cylinder, with each other, said by-pass conduit including a throttled portion, and valve means in said by-pass conduit operative to close said by-pass conduit during the delivery stroke of said main piston.

13. A pump according to claim 12, said by-pass conduit opening into said first chamber of said second cylinder at a point such that it is closed by said second piston in the position of rest thereof.

14. A pump according to claim 12 further including at least one other by-pass conduit arranged to connect said two chambers of said second cylinder with each other, said last mentioned by-pass conduit including a throttled portion, said two by-pass conduits opening into said first chamber of said second cylinder at points located at different distances respectively from said end thereof and one of said points being covered by said second piston in the position of rest thereof.

15. A pump according to claim 12 in which said spring device includes at least two springs mounted in parallel and means for bringing one of said springs out of action after said movable member has moved through a first portion of every return stroke thereof.

16. A pump according to claim 12 further including fluid control means operatively connected with said valve means for control thereof, said fluid control means making use of a fluid distinct from that flowing through said main cylinder, and auxiliary pump means operative in synchronism with said main piston and operatively connected with said fluid control means for control thereof.

17. A pump according to claim 12 further including fluid control means operatively connected with said valve means for control thereof, said fluid control means making use of a fluid distinct from that flowing through said main cylinder, and means rigidly carried by said main piston for operating said fluid control means.

18. For use with an internal combustion engine, a reciprocating action fuel pump which comprises, in combination a main cylinder, a main piston adapted to cooperate with said cylinder mounted for reciprocating displacement therein, said cylinder having a delivery orifice, a second cylinder rigid with the first one, a passage extending between one end of said second cylinder and said delivery orifice of said main cylinder, a second piston adapted to cooperate with said second cylinder, and mounted for reciprocating movement therein, said second cylinder being divided by said second piston into two chambers, to wit a first chamber located at said above mentioned end of said second cylinder and a second chamber located at the other end of said second cylinder, a fuel delivery conduit in communication with said second chamber, a check valve mounted in said passage to prevent fuel from flowing back from said first chamber to said main cylinder, a spring device interposed between said second cylinder and said second piston to exert on said second piston a return force opposed to that exerted on said second piston by the fuel pressure from said main cylinder during the delivery stroke of said main piston, a by-pass conduit arranged to connect said two chambers of said second cylinder with each other, said by-pass conduit including a throttled portion, and a slide valve in said by-pass conduit responsive to pressure variations in said main cylinder to close said by-pass conduit during the delivery stroke of said main piston.

19. For use with an internal combustion engine, a reciprocating action fuel pump which comprises, in combination, a main cylinder, a main piston adapted to cooperate with said cylinder and mounted for reciprocating displacement therein, a delivery conduit, a transmission conduit connecting the delivery end of said main cylinder with said delivery conduit, said transmission conduit including a throttled passage, a second cylinder rigid with the first one, one end of said second cylinder being in communication with the delivery end of said main cylinder through a throttled passage, and a second piston adapted to cooperate with said second cylinder, and mounted for reciprocating movement therein, said second cylinder being divided by said second piston into two chambers, to wit a first chamber located at said above mentioned end of said second cylinder and a second chamber located at the other end of said second cylinder and communicating with the portion of said transmission conduit downstream of the throttled portion thereof, said second cylinder being provided, at a point intermediate between the respective ends thereof, with a discharge port, the opening of said port taking place the earlier, during every delivery stroke of said main piston, as the speed of said main piston is higher.

20. A pump according to claim 19 further including between said end of said second cylinder and said delivery end of said main cylinder, in addition to said throttled passage, at least one conduit and a check valve in said last mentioned conduit opening only in the direction from the main cylinder toward the second cylinder.

21. A pump according to claim 19 further including a conduit, including a throttled portion, extending between an intermediate point of said transmission conduit and an intermediate point of the wall of said second cylinder, along which said second piston is moving.

22. For use with an internal combustion engine, a reciprocating action fuel pump which comprises, in combination, a pump cylinder, a piston adapted to cooperate with said cylinder mounted for reciprocating movement therein, so as to limit therewith a variable volume working space, the movements of said piston in said cylinder in the direction for which the volume of said working space is reduced being called delivery strokes and those in the opposed direction return strokes, a casing rigid with said cylinder provided with a discharge port opening to the outside, a shuttle member adapted to control said discharge port, said shuttle member fitting movably in said casing so as to limit with the inner wall thereof a variable volume chamber, the movements of said shuttle member in said casing in the direction for which the volume of said chamber is increased being called outward strokes and the movements of said shuttle member in the opposed direction being called return strokes, a fuel delivery means, conduit means in said casing including a connection from said working space to said fuel delivery means and a connection to said variable volume chamber and providing an outflow for liquid from the variable volume chamber, valve means in the connection to the variable volume chamber responsive to movements of said piston to close said connection during the return strokes of said piston, and said outflow having its smallest cross-section very substantially less than the cross-section of the shuttle member so as to slow down said liquid outflow and thus to exert on said shuttle member, during its return strokes, a braking action such that, for speeds of operation of the pump above a given value, said shuttle member return strokes are shorter as the speed of operation of the pump is higher, movement of said piston feeding liquid through said conduit means to said variable volume chamber during the delivery strokes thereof to produce outward strokes of said shuttle member, hydraulic pump means for exerting, during the return strokes of said piston, a limited pressure on said shuttle member to urge it in the direction to produce the return strokes thereof, fuel being fed to said delivery means during the delivery strokes of said piston, the feed of fuel to said delivery means being stopped during every delivery stroke of said piston at least after the shuttle member has cleared said discharge port.

No references cited.

UNITED STATES PATENT OFFICE

CERTIFICATE OF CORRECTION

Patent No. 3,003,421                      October 10, 1961

Pierre Etienne Bessiere

It is hereby certified that error appears in the above numbered patent requiring correction and that the said Letters Patent should read as corrected below.

Column 13, lines 27 and 32, for the claim reference numeral "3", each occurrence, read -- 6 --; same column lines 29 and 30, and lines 34 and 35, for "varying the cross-section of said throttled portion", each occurrence, read -- adjusting said throttling means --.

Signed and sealed this 23rd day of June 1964.

(SEAL)
Attest:

ERNEST W. SWIDER                      EDWARD J. BRENNER
Attesting Officer                       Commissioner of Patents